United States Patent [19]

Hutchins

[11] Patent Number: 5,146,126
[45] Date of Patent: Sep. 8, 1992

[54] ADJUSTABLE ROTOR ASSEMBLY

[75] Inventor: Curtis J. Hutchins, Saugus, Calif.

[73] Assignee: HR Textron Inc., Valencia, Calif.

[21] Appl. No.: 755,396

[22] Filed: Sep. 5, 1991

[51] Int. Cl.⁵ .................. H02K 21/12; F16K 31/02
[52] U.S. Cl. ..................................... 310/156; 310/91; 251/129.11
[58] Field of Search .............. 310/156, 91, 45, 84, 310/86; 251/129.11, 129.02, 129.04; 235/272, 229; 137/625.65

[56] References Cited

U.S. PATENT DOCUMENTS

| | | | |
|---|---|---|---|
| 3,203,447 | 8/1965 | Bremner et al. | 251/65 |
| 3,206,160 | 9/1965 | Bennett | 251/65 |
| 3,265,102 | 8/1966 | Yoshinaga | 251/65 |
| 3,587,016 | 6/1971 | Coakley | 335/230 |
| 3,587,650 | 6/1971 | Denker | 137/625.65 |
| 4,021,015 | 5/1977 | Maeder et al. | 251/133 |
| 4,353,523 | 10/1982 | Palti | 251/65 |
| 4,412,517 | 11/1983 | Kobashi et al. | 123/339 |
| 4,507,634 | 3/1985 | Vanderlaan | 335/272 |
| 4,546,338 | 10/1985 | Idogaki | 335/229 |
| 4,641,812 | 2/1987 | Vanderlaan | 251/65 |
| 4,742,322 | 5/1988 | Johnson et al. | 335/272 |
| 4,742,989 | 5/1988 | Akagi | 251/129.05 |
| 4,782,811 | 11/1988 | Hewette et al. | 123/571 |
| 4,789,132 | 12/1988 | Fujita et al. | 251/129.11 |
| 4,946,009 | 8/1990 | Knutson | 188/299 |
| 4,988,907 | 1/1991 | Irwin | 310/181 |

FOREIGN PATENT DOCUMENTS 58-160678  9/1983  Japan .................. 251/129.11

Primary Examiner—Steven L. Stephan
Assistant Examiner—Matthew Nguyen
Attorney, Agent, or Firm—Robbins, Dalgarn, Berliner & Carson

[57] ABSTRACT

A rotary direct drive servovalve having a force motor which includes a rotor assembly positioned within an isolation tube which is surrounded by a stator assembly. A permanent magnet is disposed adjacent a closed end of the isolation tube and is rotatable to position the rotor at a desired predetermined position by interaction of magnetic forces between the permanent magnet and permanent magnets disposed upon the rotor. The permanent magnet is clamped in position subsequent to adjustment to thereby provide centering forces on the rotor.

13 Claims, 3 Drawing Sheets

ADJUSTABLE ROTOR ASSEMBLY

FIELD OF THE INVENTION

This invention relates to direct drive servovalves and more particularly to a direct drive servovalve in which rotational motion of a motor rotor is converted into linear motion of a spool valve wherein the rotor of the drive motor is positional to a predetermined position by a magnetic force which force also functions as a magnetic spring providing a stabilizing feedback for the direct drive servovalve.

BACKGROUND OF THE INVENTION

Torque-motor driven spool valves are well known in the art including such valves which operate through the utilization of a rotary torque motor having a drive member extending from the rotor thereof into contact with the spool valve to directly reciprocate the spool valve within a bore provided in the valve housing to thereby control the flow of fluid from a source thereof to the load in response to electrical signals applied to the drive motor. Typical of such direct drive servovalves is that illustrated in U.S. Pat. No. 4,793,377 issued Dec. 27, 1988, to Larry E. Haynes et al. The invention described and claimed herein is an improvement over the direct drive servovalve disclosed in U.S. Pat. No. 4,793,377 and therefore the disclosure of U.S. Pat. No. 4,793,377 is incorporated herein by this reference.

The drive motors of such devices include a rotor and stator disposed within a housing in such a manner that the rotor assembly is subjected to the high pressure fluid typically used in servo control systems with which the device is associated. In such devices, it is desirable to have the ability to properly position the rotor to accomplish null centering of the rotor assembly. Typical of prior art devices of the type described are U.S. Pat. Nos. 4,507,634 and 4,641,812. In each of these devices, the stator position is maintained in its null by internal torsion centering springs. As is well known to those skilled in the art, as long as the drive motor is not energized, the centering springs acting on the rotor shaft will retain the rotor assembly in its null position. Moreover, after the drive motor has been activated to move the rotor assembly through its limited arcuate movement in either direction from its null position, upon de-energization of the drive motor, the centering springs will once again return the rotor assembly of its null position.

SUMMARY OF THE INVENTION

In accordance with the present invention, there is provided a direct drive servovalve which includes a valve spool reciprocally mounted within a bore in a valve housing along with motor means having a rotor and a stator and including a drive member to engage the valve for movement within the bore to provide control over the flow of fluid through the valve. A permanent magnet means is disposed adjacent a closed end of an isolation tube within which the rotor is disposed. The permanent magnet means is moveable to position the rotor at the desired null point after which the permanent magnet is secured in place relative to the rotor assembly. A separate cover means is then disposed over the motor means.

DESCRIPTION OF THE ILLUSTRATIVE EMBODIMENT

Figure 1:
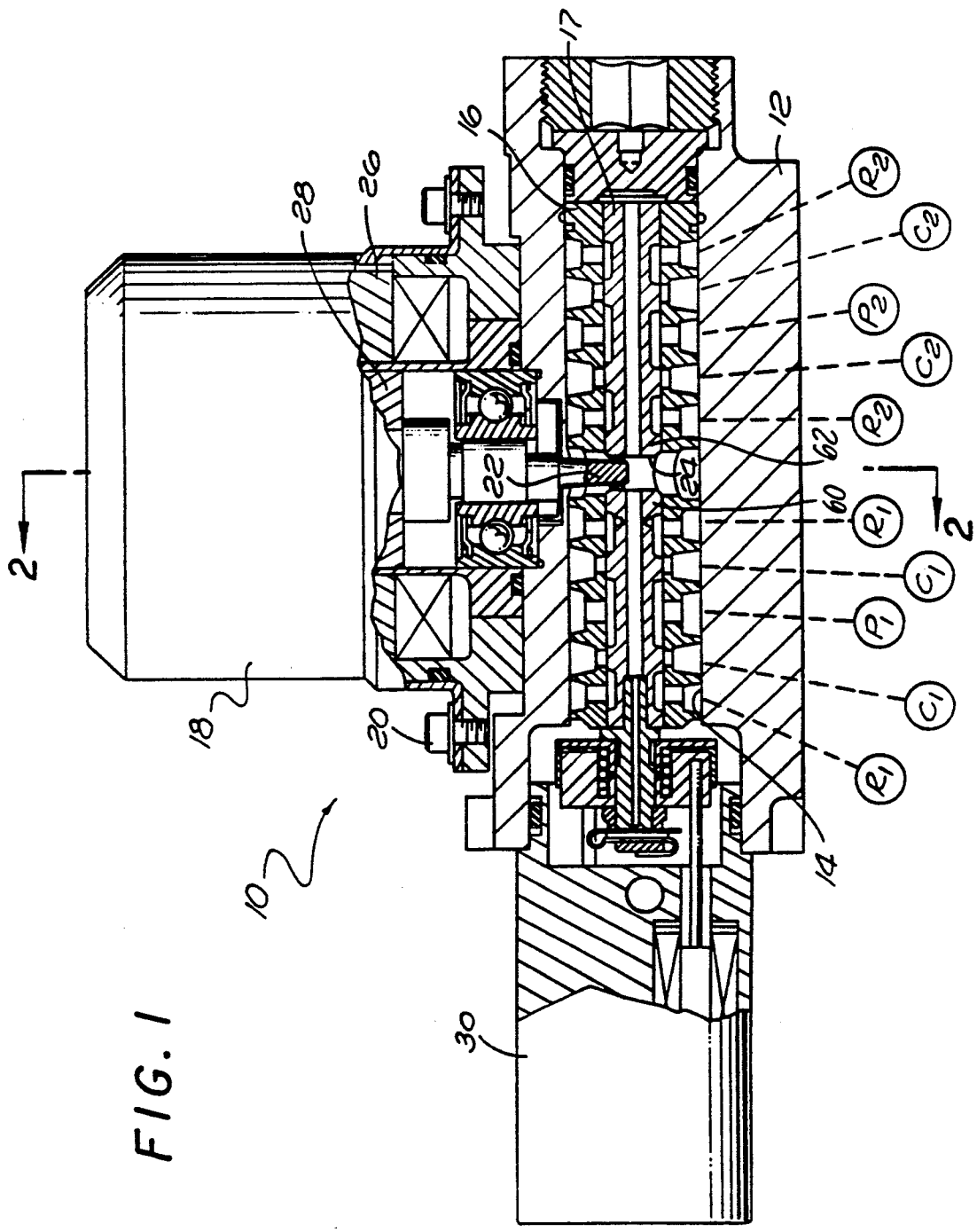
FIG. 1 is a longitudinal cross sectional view of one embodiment of a direct drive servovalve constructed in accordance with the principles of the present invention.

By reference now to FIG. 1, there is shown a direct drive valve 10 constructed in accordance with the principles of the present invention. As is therein shown, a valve housing 12 includes a bore 14 within which there is positioned a sleeve 16. A reciprocally movable spool valve 17 is mounted within the sleeve 16. A servovalve torque motor 18 is affixed to the housing 12 by means of bolts or other fasteners 20 so that a drive member 22 engages an opening 24 in the spool 17 to move the spool 17 in response to electrical signals applied to the motor means 18, as is well known in the art.

Figure 2:
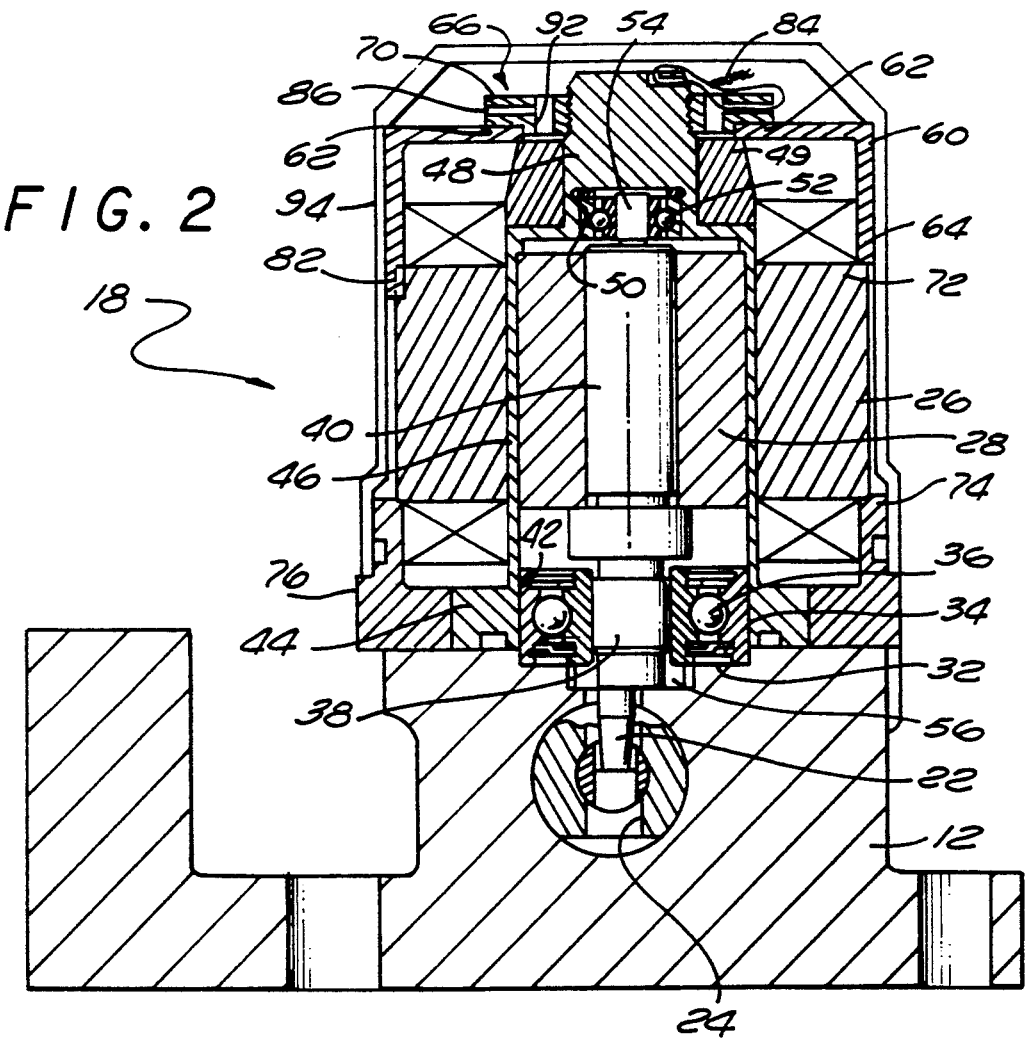
FIG. 2 is a cross sectional view taken about the lines 2—2 of FIG. 1.
Figure 3:
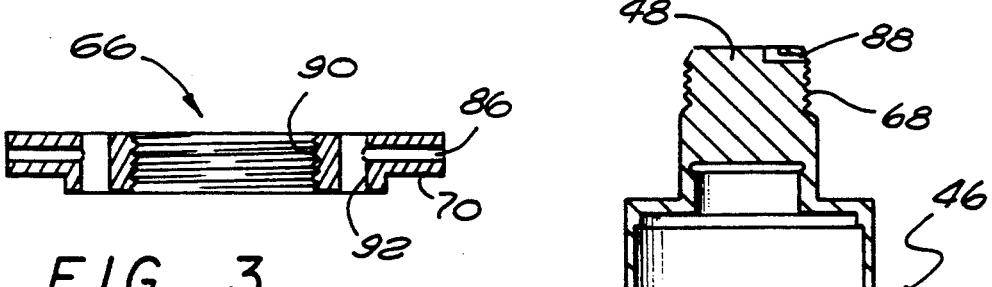
FIG. 3 is a cross sectional view of a retaining ring.
Figure 4:
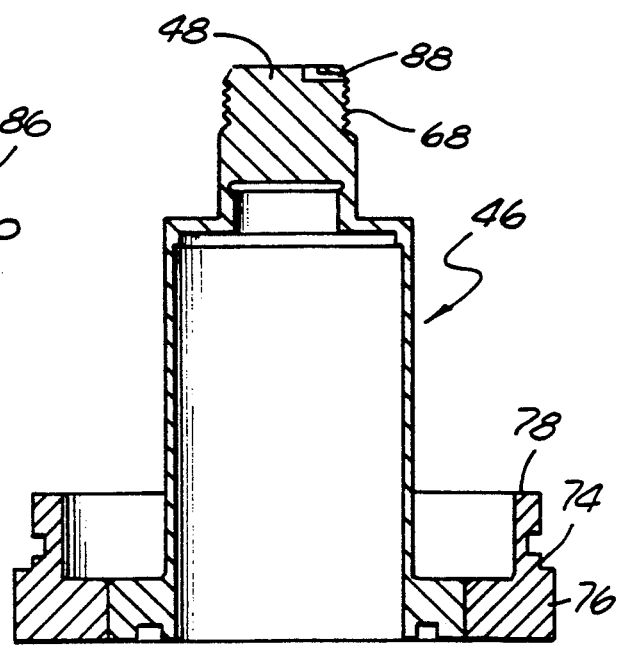
FIG. 4 is a cross sectional view of an isolation tube as used in the direct drive servovalve illustrated in FIG. 1.

As is illustrated in FIGS. 1 and 2, the motor means is a rotary motor including a stator 26 and a rotor 28 as is well known in the art.

As is shown particularly in FIG. 1, the direct drive servovalve constructed in accordance with he principles of the present invention includes appropriate ports for the control of fluid from dual sources P1 and P2 thereof under pressure to, for example, a dual tandem actuator (not shown) and from the actuator to return through the utilization of dual cylinder ports. Such is indicated by the designations P1, R1 and C1 as well as P2, R2 and C2. The valve assembly 10 may also include a Linear Variable Differential Transformer (LVDT) 30 as is well known in the prior art. The construction of the rotary direct drive servovalve as illustrated in FIGS. 1 and 2 and thus far described is well known in the prior art and additional detail with regard thereto is not believed to be necessary.

As is shown more particularly in FIG. 2, the valve housing 12 defines a first recess 32 which receives the outer surface 34 of a bearing means 36 mounted upon one end 38 of the rotor shaft 40 to the motor means 18. The recess 32 conforms to the outer surface 34 cross-sectional configuration of the bearing 36 and has a depth which is substantially less than the longitudinal length of the outer surface 34 of the bearing 36. As a result and as is clearly illustrated in FIGS. 1 and 2, when the bearing is received within the recess 32, a substantial portion of the outer surface 34 thereof protrudes from the housing 12.

As a result of the longitudinal dimension of the outer surface 34 of the bearing 36, it can be seen from FIGS. 1 and 2 that the bearing is mutually received within a second recess 42 defined by the lower portion 44 of the isolation tube 46. The isolation tube 46 surrounds the rotor 28 of the motor means 18 and isolates hydraulic fluid from the stator portion 26 of the motor means 18.

The isolation tube 46 also includes an upper closed end portion 48 thereof which defines a third recess 50 which receives a second bearing means 52. The bearing means 36 and 52 are utilized to support the rotor shaft 40 in a properly aligned position within the isolation tube 46. Such alignment is obtained by inserting the end 54 of the shaft 40 by way of an interference fit into the inner race of the bearing means 52. The outer race of the bearing means 52 is then inserted by means of a locational slip fit between the third recess 50 and the outer race of the bearing means 52. The bearing means 36 is then inserted by means of an interference fit between the outer surface 34 of the bearing means 36 and the second recess 42 inner surface as provided in the lower portion 44 of the isolation tube 46. A locational slip fit is provided between the lower portion 38 of the shaft 40 and the inner race of the bearing means 36. Subsequent to this assembly, which now provides essentially a solid structure between the isolation tube 46 and the rotor 28, the assembly is inserted into the first recess 32 by a locational slip fit between it and the outer surface 34 of the bearing means 36. It can, therefore, be seen by those skilled in the art that the outer surface 34 of the bearing means 36 is utilized as the surface with respect to which the motor assembly 18 and the housing 12 are aligned. By then appropriately aligning the sleeve 16 within the housing 12 and positioning the spool 17 therein, it can be seen that the longitudinal axis of the rotor shaft 40, the drive member 22, the opening 24 and the opening 56 through which the drive member extends are all axially aligned when viewed in FIG. 1 and when the spool 17 is in its null position.

By reference now more particularly to FIGS. 1 through 7, there is illustrated and will be described more in detail, one embodiment of a direct drive servovalve constructed in accordance with the principles of the present invention. As is illustrated, the stator 26 is secured in position by a retainer assembly which is secured to the closed upper end 48 of the isolation tube 46. In accordance with this specific embodiment, the retainer assembly is threadably secured to the outer upper surface of the isolation tube 46 in such a manner that a flange urges an annular member having a downwardly depending cylindrical skirt thereon into engagement with the stator for clamping the stator between the skirt and an upstanding wall provided as part of the motor assembly. A permanent magnet 49 is loosely received about the closed upper end portion 48 of the isolation tube 46. During assembly, as will be described below, the permanent magnet 49 may be rotated to cause the rotor assembly to follow until the spool 17 is positioned preferably at hydraulic null or such other predetermined offset position as may be desired, depending upon the particular application. After the desired positioning of the rotor assembly, the permanent magnet is secured in place by the flange on the retainer assembly. Thereafter, the magnetic forces acting between the permanent magnet 49 and the permanent magnets on the rotor function in precisely the same manner as previously used torsion or other springs, for null positioning of the rotor assembly.

Figure 5:
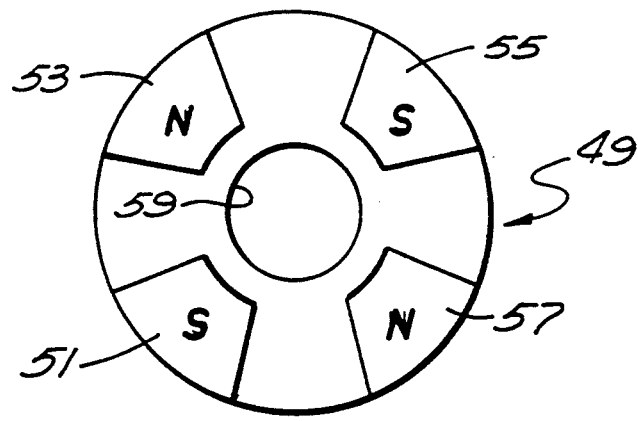
FIG. 5 is a bottom plan view of a permanent magnet.
Figure 6:
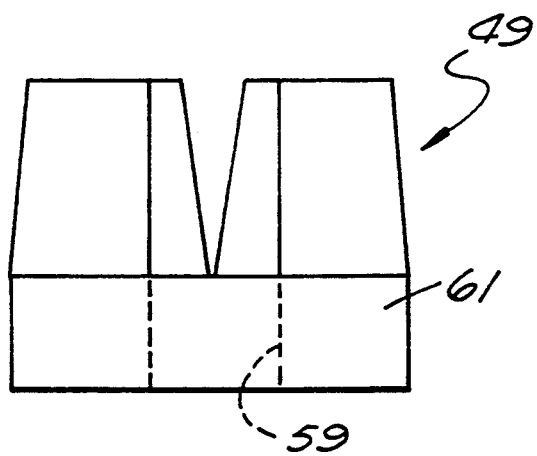
FIG. 6 is a plan view of the permanent magnet illustrated in FIG. 5.
Figure 7:
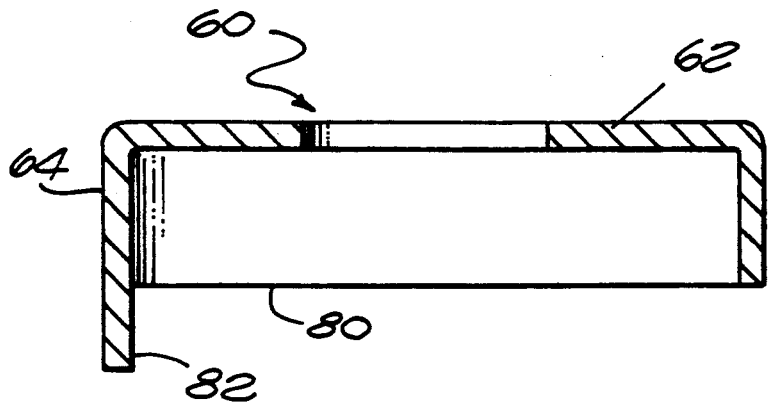
FIG. 7 is a cross sectional view of a retainer.

The permanent magnet 49 is illustrated more in detail in FIGS. 5 and 6 to which reference is hereby made. As is therein shown, the magnet 49 is a cast rare earth magnet having four poles 51, 53, 55 and 57 with polarities as shown and a central opening 59 through the annular base 61 thereof. With the magnet 49 in position on the isolation tube 46 as shown, rotation thereof will drive the rotor assembly in a like direction. It should be understood that the permanent magnet 49 may have any number of poles desired. The larger the number of poles the greater the magnetic force interacting with the rotor permanent magnets and therefore the larger the electrical signal applied to the stator must be to rotate the rotor through the desired arc.

As is shown, the retainer 60 includes an annular member 62 having a downwardly depending skirt 64. A retainer ring 66 is threadably secured to the outer surface 68 of the upper closed end 48 of the isolation tube 46. As is shown, the retainer ring 66 includes an outwardly extending flange 70 which overlaps the annular member 62 in such a manner that as the ring 66 is threaded onto the surface 68, the flange applies downwardly exerted clamping pressure against the magnet 49 and the pole piece 72 of the stator 26. There is also provided an upstanding wall 74 which is part of the base 76 of the isolation tube 46. The wall 74 defines a shoulder 78 upon which the pole piece 72 rests.

The downwardly depending skirt 64 defines a peripheral edge 80 from which depends a key 82. The key 82 engages a key way provided in the pole piece 72 so that when the retaining member 60 is disposed in place, as illustrated in FIG. 2, rotation of the retaining member 60 also rotates the stator 26. Such rotation is utilized to accomplish appropriate null balance of the direct drive servovalve.

To accomplish the desired null balance of the direct drive servovalve as illustrated in FIGS. 1 and 2, the magnet 49 is rotated about the closed upper end 48 of the isolation tube 46 to rotate the rotor assembly and in turn to drive the spool 17 to a position so that it is at the hydraulic null where no fluid flow (other than leakage) is taking place between the source and drain for the valve. Thereafter, the stator 26 is rotated so that a magnetic peak is obtained insofar as positioning of the stator and rotor are concerned. After this adjustment, the retaining ring 66 is securely tightened thus applying the clamping force as above-described to secure the magnet 49 and the stator in place in proper adjustment. As a security measure, a lock wire 84 is threaded through appropriate openings provided in the retaining ring 66 and the top 48 of the isolation tube 46 to preclude loosening inadvertently of the retaining ring 66. To accommodate the locking wire, openings 86 are provided in the flange 70 of the locking ring 66 while openings 88 are provided in the upper closed end 48 of the isolation tube 46. In addition, to secure the locking ring, threads are formed on the inner surface 90 thereof which are threadably received by the threads formed on the outer surface 68 of the upper portion 48 of the isolation tube 46. Openings 92 are provided in the locking ring to receive an appropriate tool for properly torquing the locking ring in place so that the flange 70 clamps the stator 26 between the periphery 80 of the retainer 60 and the shoulder 78 of the wall 74.

After the drive motor has been thus assembled, it can function adequately at this time. However, to preclude contamination of the coils in the stator 26 and to otherwise protect the same, a housing 94 is secured in place by the fasteners 20 to environmentally protect the motor 18. As will be evident to those skilled in the art, the housing 94 does not function in any fashion to clamp or otherwise secure the stator or any other portion of the drive motor.

There has thus been disclosed an embodiment of a direct drive servovalve having a permanent magnet for positioning the rotor assembly thereof with a retainer assembly which clamps the permanent magnet and the stator of the drive motor in place.

What is claimed is:

1. A rotary force motor comprising:
(A) an isolation tube having a closed end portion;
(B) a rotor assembly having first permanent magnet means disposed upon a shaft rotatably disposed within said isolation tube;
(C) a stator assembly for receiving electrical signals to rotate said rotor assembly, said stator assembly surrounding said isolation tube; and
(D) a second permanent magnet means disposed adjacent said closed end portion of said isolation tube for magnetically interacting with said rotor to provide a rotary force acting on said rotor to return said rotor to a predetermined position in the absence of electrical signals applied to said stator assembly.

2. A rotary force motor as defined in claim 1 wherein said second permanent magnet means surrounds said isolation tube closed end portion.

3. A rotary force motor as defined in claim 1 which further includes clamping means for securing said second permanent magnet in position.

4. A rotary force motor as defined in claim 3 wherein said clamping means is threadably secured to said isolation tube.

5. A rotary direct drive servovalve comprising:
(A) a valve housing defining a bore therein;
(B) a valve spool reciprocally received within said bore for movement to control fluid flow therethrough from a supply port;
(C) rotary motor means having a rotor and a stator, said rotor rotating responsive to electrical signals applied to said stator, said motor means including a drive member for engagement with said valve spool at a predetermined point to reciprocally move said valve spool in said bore;
(D) said rotor including an isolation tube having a closed end;
(E) said stator surrounding said isolation tube;
(F) a permanent magnet disposed adjacent said closed end of said isolation tube for magnetically interacting with said rotor to provide a rotary force on said rotor to return said rotor to a predetermined position in the absence of electrical signals applied to said stator; and
(G) means for securing said permanent magnet adjacent said closed end of said isolation tube.

6. A rotary direct drive servovalve as defined in claim 5 wherein said securing means further includes a retainer member having a flange extending outwardly from said isolation tube.

7. A rotary direct drive servovalve as defined in claim 6 wherein said retainer member is threadably secured to said isolation tube.

8. A rotary direct drive servovalve as defined in claim 7 wherein said retainer member is a ring having a threaded interior surface and said isolation tube includes a threaded exterior surface adjacent said closed end for threadably receiving said ring.

9. A rotary direct drive servovalve as defined in claim 8 wherein said retainer member and said closed end of said isolation tube each defines a plurality of openings therethrough for receiving a locking wire.

10. A rotary direct drive servovalve as defined in claim 5 wherein said securing means further includes an annular member having a downwardly extending skirt defining a first alignment means.

11. A rotary direct drive servovalve as defined in claim 10 wherein said first alignment means is a key extending from said skirt.

12. A rotary direct drive servovalve as defined in claim 11 wherein said rotor defines a key way for receiving said key defined by said skirt member.

13. A rotary direct drive servovalve as defined in claim 12 which further includes a wall member defining a shoulder, said stator being clamped between said skirt member and said shoulder when said retainer member is threadably secured to said isolation tube.

* * * * *